April 3, 1956     H. L. YATES     2,740,664
LAWN SPRAYING DEVICE
Filed July 16, 1953

INVENTOR.
Herbert L. Yates
BY
*Sam J. Slotky*
ATTORNEY

United States Patent Office 2,740,664
Patented Apr. 3, 1956

2,740,664

LAWN SPRAYING DEVICE

Herbert L. Yates, Akron, Iowa

Application July 16, 1953, Serial No. 368,313

2 Claims. (Cl. 299—45)

My invention relates to a lawn spraying device.

An object of my invention is to provide a device for spraying liquid insecticides or other solutions, and wherein the sprays are concentrated within a chamber so that the wind or air currents will not convey the spray to plants where it is not desired.

A further object of my invention is to provide a spraying arrangement wherein the device will function regardless of the contour of the ground, and wherein a collapsible arrangement will permit such use.

A further object of my invention is to provide a convenient carriage arrangement for supporting the spraying devices, and which can be alternately converted for other purposes.

Figure 1:
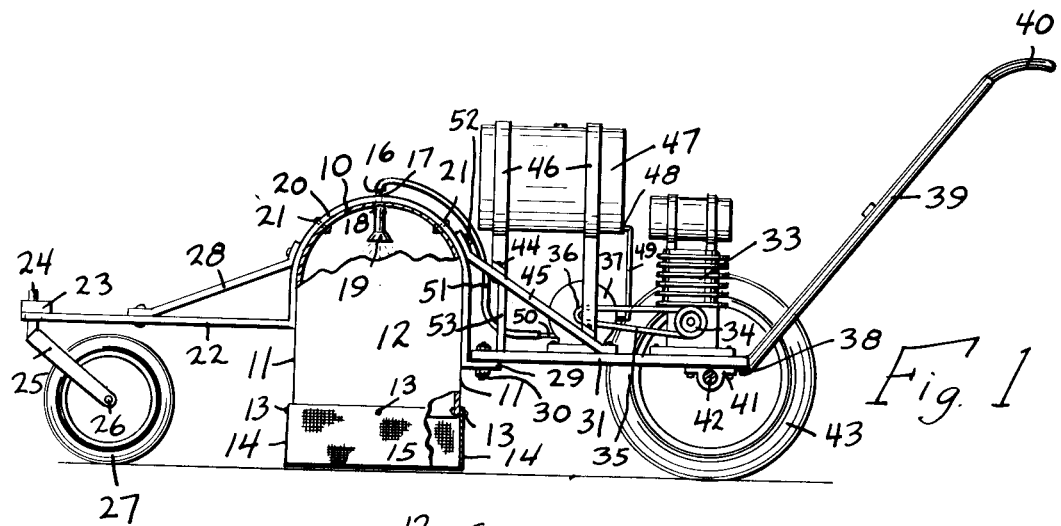
Figure 2:
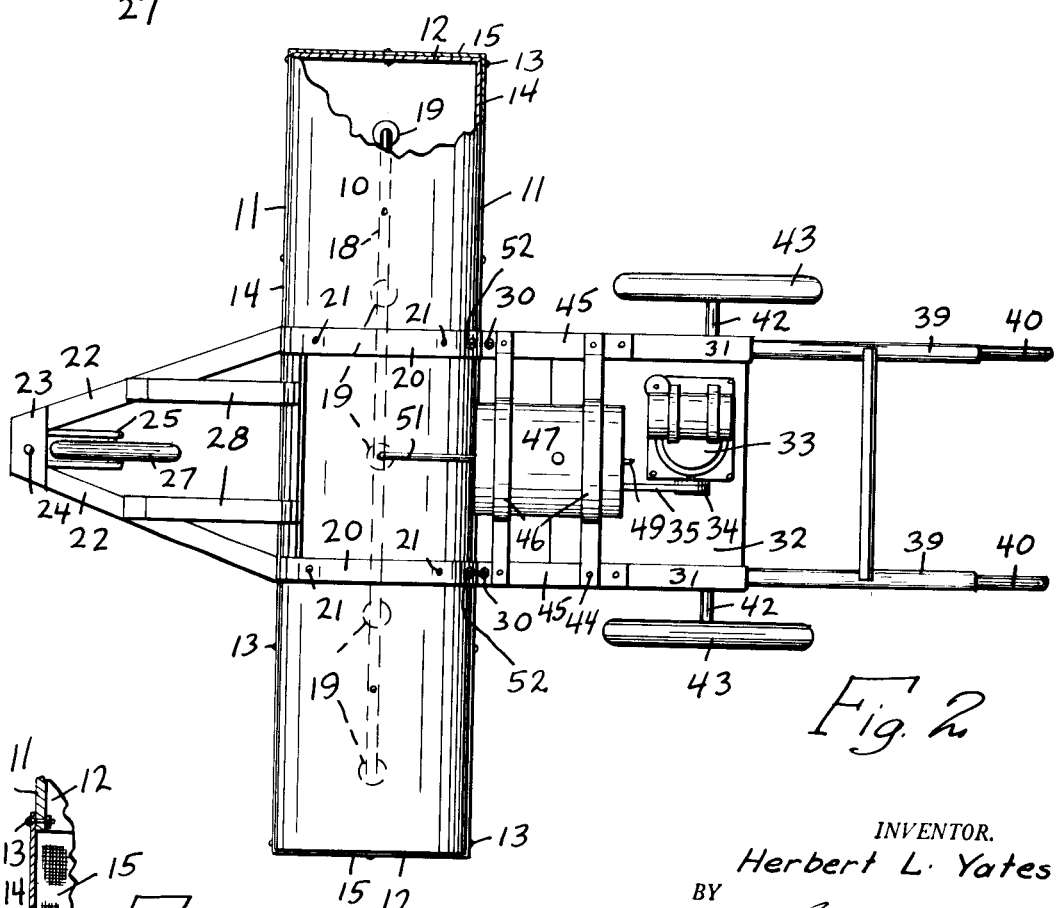
Figure 3:
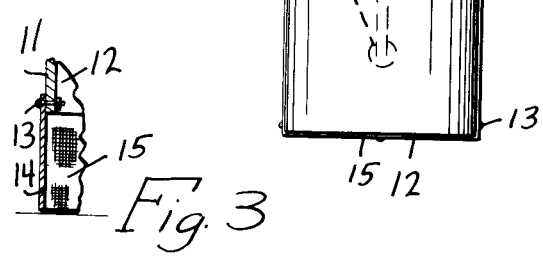

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the arrangement with portions being taken in cross section, Figure 2 is a plan view of Figure 1, and Figure 3 is a detail.

I have used the character 10 to designate an arcuate hood having a fairly substantial width laterally, and which includes the downwardly extending side walls 11, and end walls 12.

Attached by means of suitable stove bolts 13 about the lower edge of this chamber is a fabric member having side walls 14 and end walls 15, this fabric member being adapted to fairly closely engage the ground surface.

Passing through the center of the hood portion 10 at 16 is a short nipple 17 which communicates with the transverse pipe 18, which pipe communicates with a series of equally spaced spray heads 19.

The hood portion 10 is supported to the arcuate strap members 20 by means of the bolts 21, the strap members 20 terminating in the forwardly inwardly converging portions 22 to which is attached the cross member 23, in which cross member is pivotally mounted the vertical shaft 24 of a fork member 25 to which is journalled at 26 a forward wheel 27.

Further braces 28 are provided to strengthen the arrangement.

The members 20 also extend into the pair of horizontally positioned portions 29 which are bolted at 30 to the horizontally positioned strap members 31 between which members is attached a base member 32 upon which is secured the gas engine 33, the gas engine 33 driving the pulley 34 over which passes the belt 35 which passes over a further pulley 36 for driving the pump 37. Attached at the ends of the members 31 at 38 are the upwardly inclined handle members 39 terminating in the grasping portions 40.

Secured to the members 31 are the brackets 41 in which is secured the transverse shaft 42 upon which are journalled the side wheels 43.

Secured at 44 to the further bracing members 45 are the straps 46 which enclose and retain the tank 47, the tank 47 being for the purpose of containing the insecticide or other liquid which is to be sprayed, and communicating with the tank 47 at 48 is the tube 49 which communicates to the pump 37, and also communicating from the pump 37 is the short pipe 50 to which is attached the flexible tube 51, the tube 51 being attached to the nipples 17. The bracing members 45 are secured by means of the bolts 52 to the strap members 20. The character 53 designates further bracing members.

It will now be seen that as the device is pushed forwardly by grasping the handle portions 40, that the engine will drive the pump 37, and whereby the liquid in the tank 47 will be sprayed through the spray heads 19, such spray heads forcing the liquid downwardly upon the plants and the like, and it will be noted further that the sprays will be concentrated within the enclosed chamber as explained, whereby such sprays can not pass outwardly beyond the confines of the chamber.

The flexible fabric member comprising the walls 14 and 15 also insures that the spray is concentrated and at the same time allows the device to pass over plants and irregularities due to the flexible nature of the fabric.

Also, by removing the bolts 30 and 52, the concentrating chamber 10 etc. can be removed from the unit, the right-hand portion of the device as seen in Figure 1 can then be wheeled to any point desired independently of the balance of the arrangement, and with a lengthened tube being attached to the pipe 50 whereby the unit can then be used for hand spraying and the like.

The device is thus readily adaptable for either condition, and it will thus be seen that the device fulfills a variety of needs and will concentrate the spray directly to the surface required, without danger to other plants and the like.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A lawn spraying device comprising a hollow casing having end, top, and side walls, a spraying unit mounted in said casing including a laterally positioned pipe including a plurality of spray outlets attached thereto, means for forcing spraying liquid into said pipe, including a carriage portion attached to said hollow casing, a tank mounted on said carriage portion, said tank including said liquid, a pump communicating with said tank and said pipe, means for driving said pump, means for providing detachment of said carriage portion from said casing whereby said pump can be employed for operation independently of the casing, means for supporting said casing including a pair of substantially arcuate strap members attached to the casing, and having a forward wheeled portion.

2. A lawn spraying device comprising a hollow casing having end, top, and side walls, a spraying unit mounted in said casing including a laterally positioned pipe including a plurality of spray outlets attached thereto, means for forcing spraying liquid into said pipe, including a carriage portion attached to said hollow casing, a tank mounted on said carriage portion, said tank including said liquid, a pump communicating with said tank and said pipe, means for driving said pump, means for providing detachment of said carriage portion from said casing whereby said pump can be employed for operation independently of the casing, means for supporting said casing including a pair of substantially arcuate strap members attached to the casing, and having a forward wheeled portion, wheels journalled on said carriage portion.

References Cited in the file of this patent

UNITED STATES PATENTS

| | | |
|---|---|---|
| 1,465,557 | Oldham | Aug. 21, 1923 |
| 1,500,857 | Woodruff | July 8, 1924 |
| 1,539,789 | Walker | May 26, 1925 |
| 1,807,469 | Brehmer | May 26, 1931 |
| 2,086,055 | Taylor | July 6, 1937 |
| 2,518,771 | Gol | Aug. 15, 1950 |